United States Patent Office 3,221,052
Patented Nov. 30, 1965

3,221,052
SALICYLANILIDE PROCESS
Theodore E. Majewski, 3713 Moorland Drive, Midland, Mich., and Daniel W. Tarkowski, 502 S. Park St., Bay City, Mich.
No Drawing. Filed Mar. 1, 1963, Ser. No. 262,256
5 Claims. (Cl. 260—559)

This invention relates to a process for making salicylanilide whereby a product of improved appearance and purity is obtained by a more convenient and economical procedure than hitherto available.

Salicylanilide is conventionally prepared by reacting a mixture of salicylic acid and aniline with phosphorus trichloride at a moderately elevated temperature. An improved method for carrying out this reaction wherein the reactants are combined in approximately the theoretical proportions in an inert liquid diluent at a low temperature before being heated to the reaction temperature has been described by Bernan et al., U.S. 2,763,683. The preferred procedure for separating the salicylanilide product from the reaction mixture is disclosed in this patent as comprising the steps of (1) steam distilling the mixture to remove the inert diluent, (2) treating the distillation residue with alkali to neutralize any remaining traces of acid and to liberate aniline present as its acid salt, (3) steam distilling the neutralized residue to remove such liberated aniline, and (4) cooling and filtering the residue from the second steam distillation to obtain the salicylanilide product.

While the above described separation procedure is an effective method for obtaining a good yield of reaction product, it has a number of disadvantages, particularly when it is applied on a commercial scale. Among the unfavorable economic aspects of the method there are included high steam requirements and unduly extended process time because of the nature and number of the steps involved. An additional disadvantage of the process is the viscous or semisolid character of the slurry obtained after each of the two steam distillations. This causes difficulties in handling, particularly in the final filtration. Actual caking of the product in the reactor is often encountered. Elimination of the second steam distillation saves time and steam, but the product thereby obtained is relatively impure and is light brown in color instead of white as is commercially desirable.

It has now been found that a simplified separation process utilizing some of the above-described steps but in different order not only saves time and steam, but also yields a product of improved purity and color. In brief, this new process is based essentialy on a controlled neutralization of the reaction mixture directly after the heating period wherein the reaction is accomplished, whereupon there is a rapid and complete separation of the reaction mixture into an organic layer containing the salicylanilide product in solution and an aqueous layer containing in solution substantially all of the byproducts and impurities. The organic layer can then be separated easily from the inorganic components and worked up by a suitable procedure to obtain the product. A particularly advantageous procedure is to steam distil the organic layer, whereby the inert diluent liquid is removed and the distillation residue obtained is an aqueous slurry of essentially pure salicylanilide, needing only filtration and drying to separate a white crystalline product.

In the critical neutralization step, it has been found that addition to the reaction mixture of sufficient aqueous alkali to give a water layer having a pH between about 3.7 and about 11 gives a rapid and complete separation of aqueous and organic layers. Below about pH 3.7, the separation of the layers is slow and incomplete while above about pH 11, salicylanilide reacts to form the alkali metal salt. At least about 0.4 equivalent weight of alkali is required per equivalent weight of phosphorus trichloride, the upper limit of alkali being dependent upon the basicity of the particular alkali employed. Remaining small amounts of unreacted salicylic acid are dissolved and separated in the aqueous layer when this quantity of alkali is used. Any of the alkali metal hydroxides or carbonates are suitable for this use. Sodium hydroxide or carbonate is preferred. The concentration of the aqueous alkali is adjusted so as to produce aqueous and organic layers of sufficiently different densities to facilitate the rapid and complete separation of these layers. This is also dependent upon the diluent solvent employed.

Suitable diluent liquids, as disclosed in U.S. 2,763,683, are the hydrocarbon and chlorohydrocarbon liquids which are free of olefinic or acetylenic linkages, particularly such liquids boiling above about 75° C. Suitable diluents include aliphatic hydrocarbons, such as petroleum ether, kerosene, and naphtha, cycloaliphatic hydrocarbons such as cyclohexane and decahydronaphthalene, chloroaliphatic compounds such as carbon tetrachloride, aromatic hydrocarbons such as benzene, toluene, xylene, and the like, and chloroaromatic compounds such as chlorobenzene, chlorotoluene, and o-dichlorobenzene. Of these, chlorohydrocarbons are usually preferred and chlorobenzene is particularly suitable. The proportion of diluent is not critical but ordinarily about one to about six parts by weight of diluent is employed per part of total reactants.

When chlorobenzene is the diluent liquid used, it is most convenient to add aqueous sodium hydroxide or carbonate in about 10 percent concentration by weight, thereby obtaining a rapid and complete separation of the aqueous layer as the lower layer which is then easily drained from the bottom of the reactor.

The separation of layers is done at a temperature sufficiently high to prevent precipitation or crystallization of salicylanilide from the organic layer but below the boiling point of the reaction mixture. When chlorobenzene is the diluent in proportions as previously described, for example, an appropriate separation temperature lies in the approximate range between about 70° C. and about 89° C., the boiling point of this mixture.

The following examples illustrate preferred modes of operating this separation process, but are not to be construed as limiting the scope of the invention.

*Example 1*

A mixture of 600 ml. of chlorobenzene, 138 g. of salicylic acid, and 45.6 g. of phosphorus trichloride was formed at about room temperature. To this mixture there was added 93.2 g. of aniline over a 30 minute period at about 25–40° C. The slurry thereby obtained was added in 30 minutes to 600 ml. of chlorobenzene which was maintained at 125–133° C. After the addition, the reaction mixture was stirred for 2.5 hours at this temperature. The mixture was then cooled to 85° C. and 300 g. of 10 percent aqueous sodium hydroxide was added. After stirring for 30 minutes, the mixture was allowed to settle. It separated rapidly into clearly defined layers, an upper organic layer and a lower clear aqueous layer. The aqueous layer, which was alkaline, having a pH of 8.3, was drawn off at 80° C. and the organic layer remaining in the flask was steam distilled to remove chlorobenzene. After all of the chlorobenzene had been steam distilled from the organic layer, a thin, easily handled slurry of crystalline salicylanilide in water remained in the flask. This was filtered to obtain 190.3 g. of white salicylanilide of about 99 percent purity by analysis, M.P. 135.7–136.1° C.

Example 2

A mixture of 240 ml. of chlorobenzene, 55.3 g. of salicylic acid, and 18.3 g. of phosphorus trichloride was stirred together in a reaction flask. To this mixture there was added 37.2 g. of aniline over a 20 minute period while the temperature of the reaction mixture was held at 25–40° C. The slurry thereby obtained was then added portionwise in 30 minutes to 240 ml. of chlorobenzene at 125–133° C. After the addition was complete, the reaction mixture was stirred for 2.5 hours at 125–133° C.

The reaction mixture was then cooled to 90° C. and 67.2 g. of water was added, causing separation of an acid aqueous layer which rose to the top. The two phase mixture was stirred while 105 g. of 23 percent sodium carbonate solution was added. After stirring for 15 minutes the mixture was again allowed to settle, whereupon it separated rapidly into sharply defined layers, an upper orgaic layer and a clear aqueous lower layer. The alkaline aqueous layer (pH=8.9) was drained from the flask and the remaining organic layer was steam distilled to remove chlorobenzene, leaving a residual aqueous slurry of salicylanilide in the flask. This product was filtered and dried to obtain 69.6 g. of white salicylanilide of better than 99 percent purity, M.P. 135.8–136.2° C.

Example 3

A mixture of 240 ml. of chlorobenzene, 55.3 g. of salicylic acid, and 18.3 g. of phosphorus trichloride was stirred together in a reaction flask. To this mixture there was added 37.2 g. of aniline over a 20 minute period while the temperature of the reaction mixture was held at 25–40° C. The slurry thereby obtained was then added portionwise in 30 minutes to 240 ml. of chlorobenzene at 125–133° C. After the addition was complete, the reaction mixture was stirred for 2.5 hours at 125–133° C.

The reaction mixture was then cooled to 80° C. and 33.1 g. of 20 percent sodium hydroxide was added. After stirring for 1 hour at 80° C. the layers did not separate. To the mixture 32.9 g. of water was added making a 10 percent sodium hydroxide solution. After stirring 5 minutes, the mixture was allowed to settle, whereupon it separated rapidly into sharply defined layers, an upper organic layer and a clear aqueous lower layer. The aqueous layer (pH=3.8) was drained from the flask and the remaining organic layer was steam distilled to remove chlorobenzene, leaving a residual aqueous slurry of salicylanilide in the flask. The product was filtered and dried to obtain 68.8 g. of white salicylanilide of about 99 percent purity by analysis, M.P. 135.9–136.1° C.

Example 4 illustrates the inferior results obtained when the prior art process is shortened by eliminating the second steam distillation, but wherein the preliminary layer separation of the present invention is not employed.

Example 4

A mixture of 138 g. of salicylic acid, 45.8 g. of phosphorus trichloride, and 93.1 g. of aniline in 400 g. of chlorobenzene was prepared at a temperature below 40° C. as in Examples 1 and 2. This slurry was then added to a reactor containing 600 g. of chlorobenzene at 125° C. with stirring as shown above. The reaction mixture was then stirred for 2 hours at 125–133° C., in which time the theoretical 1 g. mole of HCl was evolved. The mixture was cooled to 100° C. and the chlorobenzene diluent was removed by steam distillation. The somewhat gummy aqueous slurry of salicylanilide remaining in the reactor flask was filtered, washer with sodium carbonate solution, and then washed with water. Upon drying the product, 192.3 g. of light brown salicylanilide was obtained. This material had a melting point of 133–134° C. and was found to be of about 97 percent purity upon analysis.

We claim:

1. In a process for making salicylanilide wherein a mixture of salicylic acid, aniline, phosphorus trichloride, and an inert liquid diluent is heated to a temperature between about 75° C. and about 180° C. until the reaction is substantially complete, the improvement of adding to the mixture thereby obtained at least about 0.4 equivalent weight of aqueous alkali per equivalent weight of phosphorus trichloride, thereby causing the separation of said mixture into an organic solution and an aqueous solution of pH between about 3.7 and about 11, and separating said solutions.

2. A process for separating salicylanilide from the reaction mixture obtained by heating one mole of phosphorus trichloride with about 3 moles of aniline and about three moles of salicylic acid in the presence of an inert diluent liquid at about 75° C. to about 180° C. until evolution of hydrogen chloride is substantially complete, which process comprises adding to said reaction mixture at least about 0.4 equivalent weight of aqueous alkali per equivalent weight of phosphorus trichloride thereby causing the separation of said mixture into an aqueous solution of pH between about 3.7 and about 11 and an organic solution consisting essentially of salicylanilide dissolved in the inert diluent, separating said solutions, and separating salicylanilide from said organic solution.

3. The process of claim 2 wherein the inert diluent is chlorobenzene.

4. The process of claim 2 wherein the inert diluent is separated from the organic solution by steam distillation.

5. A process for separating salicylanilide from the reaction mixture obtained by heating one mole of phosphorus trichloride with about three moles of aniline and about three moles of salicylic acid in the presence of chlorobenzene at about 75° C. to about 180° C. until evolution of hydrogen chloride is substantially complete, which process comprises adding to said reaction mixture at least about 0.4 equivalent weight of aqueous alkali per equivalent weight of phosphorus trichloride, thereby causing the separation of said mixture into an aqueous solution of pH between about 3.7 and about 11 and an organic solution consisting essentially of salicylanilide dissolved in chlorobenzene, separating said solutions, steam distilling said organic solution until substantially all the chlorobenzene has been removed, and separating salicylanilide from the steam distillation residue thereby obtained.

References Cited by the Examiner

UNITED STATES PATENTS

| | | | |
|---|---|---|---|
| 2,410,397 | 10/1946 | Weiss et al. | 260—559 |
| 2,763,683 | 9/1956 | Beman et al. | 260—559 |

FOREIGN PATENTS

| | | |
|---|---|---|
| 818,299 | 8/1959 | Great Britain. |

WALTER A. MODANCE, *Primary Examiner.*

NICHOLAS S. RIZZO, *Examiner.*